United States Patent [19]

Tyros

[11] Patent Number: 4,611,461
[45] Date of Patent: Sep. 16, 1986

[54] OLIVE PICKER WITH SPEED CONTROL AND SELECTED PICKER DIMENSIONS

[76] Inventor: James C. Tyros, River Rd., New Ipswich, N.H. 03071

[21] Appl. No.: 607,235

[22] Filed: May 4, 1984

[51] Int. Cl.⁴ .............................................. A01D 46/00
[52] U.S. Cl. .................... 56/328 R; 56/10.5; 56/330
[58] Field of Search .................. 56/328 R, 10.8, 10.5, 56/11.1, 11.2, 12.5, 12.4, 330, 328 TS, 332, 339

[56] References Cited

U.S. PATENT DOCUMENTS

| | | | |
|---|---|---|---|
| 3,517,496 | 1/1970 | Kemp et al. | 56/328 R |
| 3,552,107 | 1/1971 | Swift | 56/328 R |
| 3,968,631 | 7/1976 | Haines | 56/328 R |
| 4,069,652 | 1/1978 | Carlson | 56/328 R |
| 4,357,790 | 11/1982 | Tyros | 56/328 R |
| 4,418,521 | 12/1983 | Orlando et al. | 56/330 |

Primary Examiner—Paul J. Hirsch
Assistant Examiner—John G. Weiss
Attorney, Agent, or Firm—Pearson & Pearson

[57] ABSTRACT

An olive picker with a rotor of spaced hooked tines in a picking head, at the top of an elongated, manually manipulatable handle, is provided with a set of such rotors having tines of different dimensions and spacing. Quick release, spring biased shaft rods on each rotor enable easy substitution of rotors for different sized olives. A variable speed control is provided on the handle, within easy reach of the operator to produce a range of from 15 rpm to 75 rpm to conform to the age, skill or physical condition of the operator.

3 Claims, 6 Drawing Figures

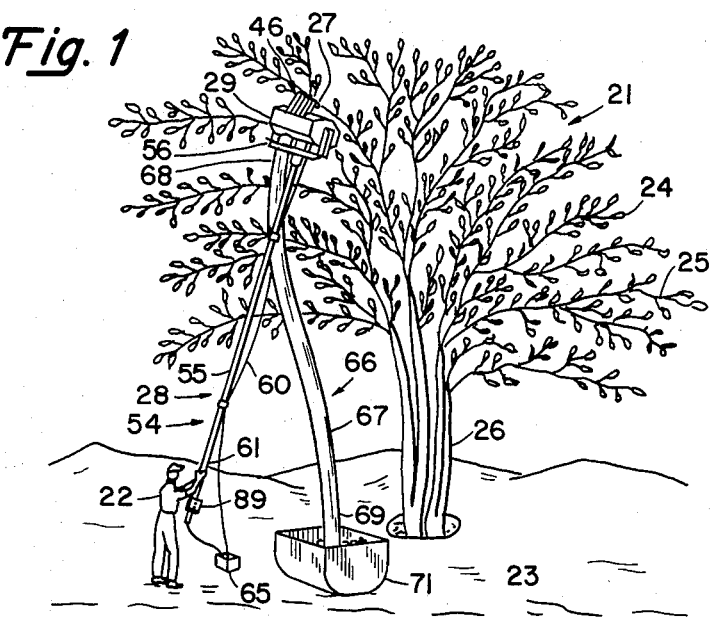
Fig. 1
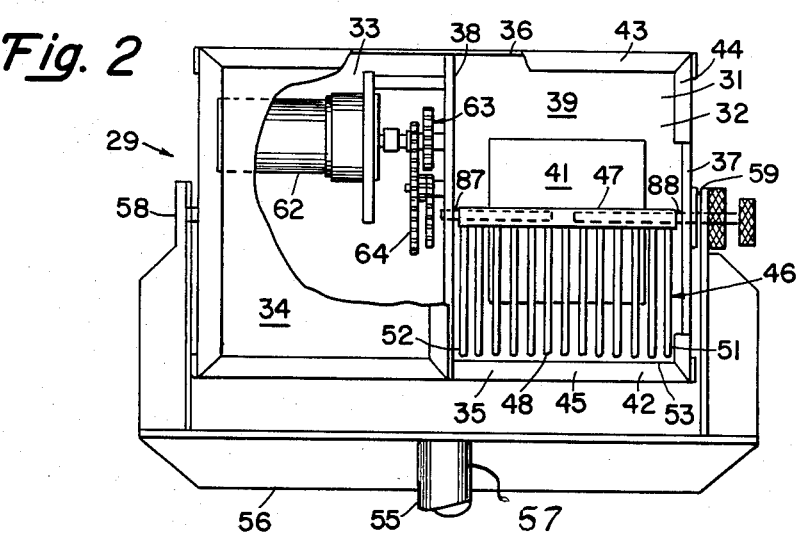
Fig. 2
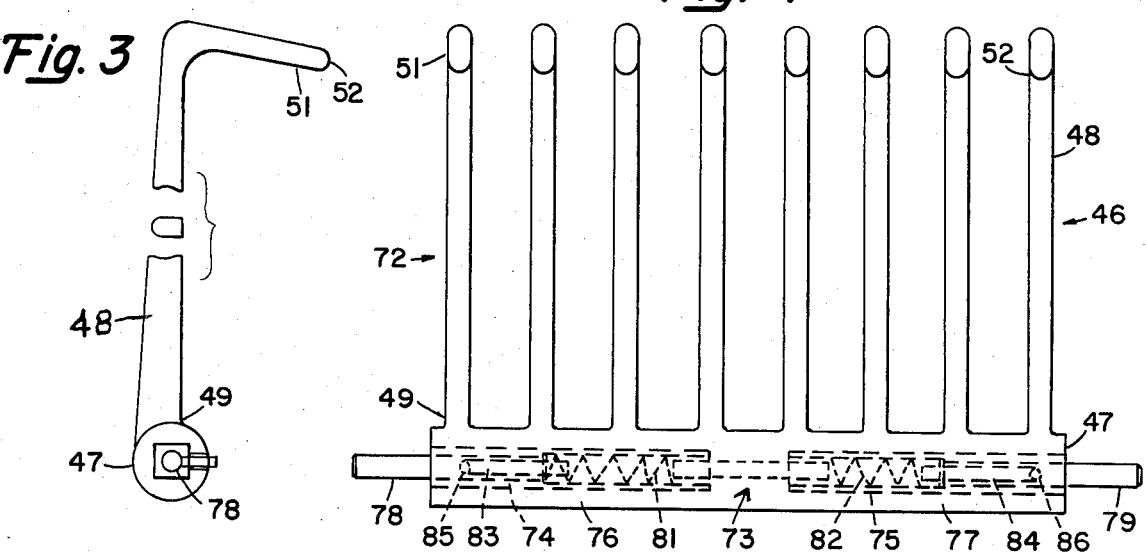
Fig. 3
Fig. 4

OLIVE PICKER WITH SPEED CONTROL AND SELECTED PICKER DIMENSIONS

BACKGROUND OF THE INVENTION

In my U.S. Pat. No. 4,357,790 of Nov. 9, 1982, an olive picker is disclosed in which the picker head is mounted on the end of a hand manipulatable, elongated, handle, the rotor being powered by a flexible conduit to a source of power at ground level.

The power was preferably a 12 volt battery and the motor electric and reversible, so that the hooked tines cooperated with a ledge on the housing to detach olives while passing through leaves and twigs.

It has been found that easy change of the size and spacing of the hooked tines, or pickers, would be advantageous to conform to the size, or stage of ripeness of olives on a particular olive tree or in a particular olive grove.

It has also been found that it would be useful to be able to control the speed of rotation of the rotor and tines to conform to the stage of ripeness, density of foliage in the tree, or trees, and to conform to the age, skill and physical condition of the operator. Some young, robust, or strong older operators can pick olives with the picking apparatus of the invention at top speed, but it is useful to be able to reduce speed to accommodate those less able to compete in the wear and tear of a day's work or when their stronger brethren become weary from olive picking during the day.

BRIEF DESCRIPTION OF THE DRAWING

FIG. 1, is a diagrammatic, perspective view, illustrating the tree picking apparatus of the invention;

FIG. 2, is an enlarged top plan view of the picking head and its gimbal yoke with one of the set of different sized rotors in place;

FIG. 3, is a still further enlarged, fragmentary end elevation and;

FIG. 4, is a top plan view of one of the rotors of the invention;

DESCRIPTION OF A PREFERRED EMBODIMENT

Figure 5:
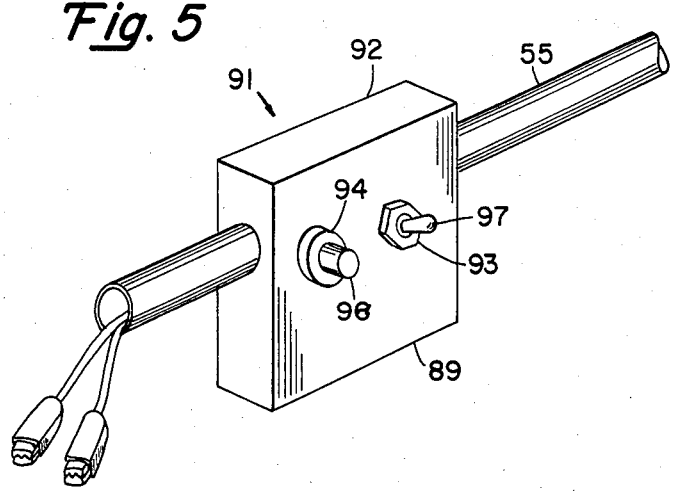
FIG. 5, is a fragmentary perspective view of the control box.
Figure 6:
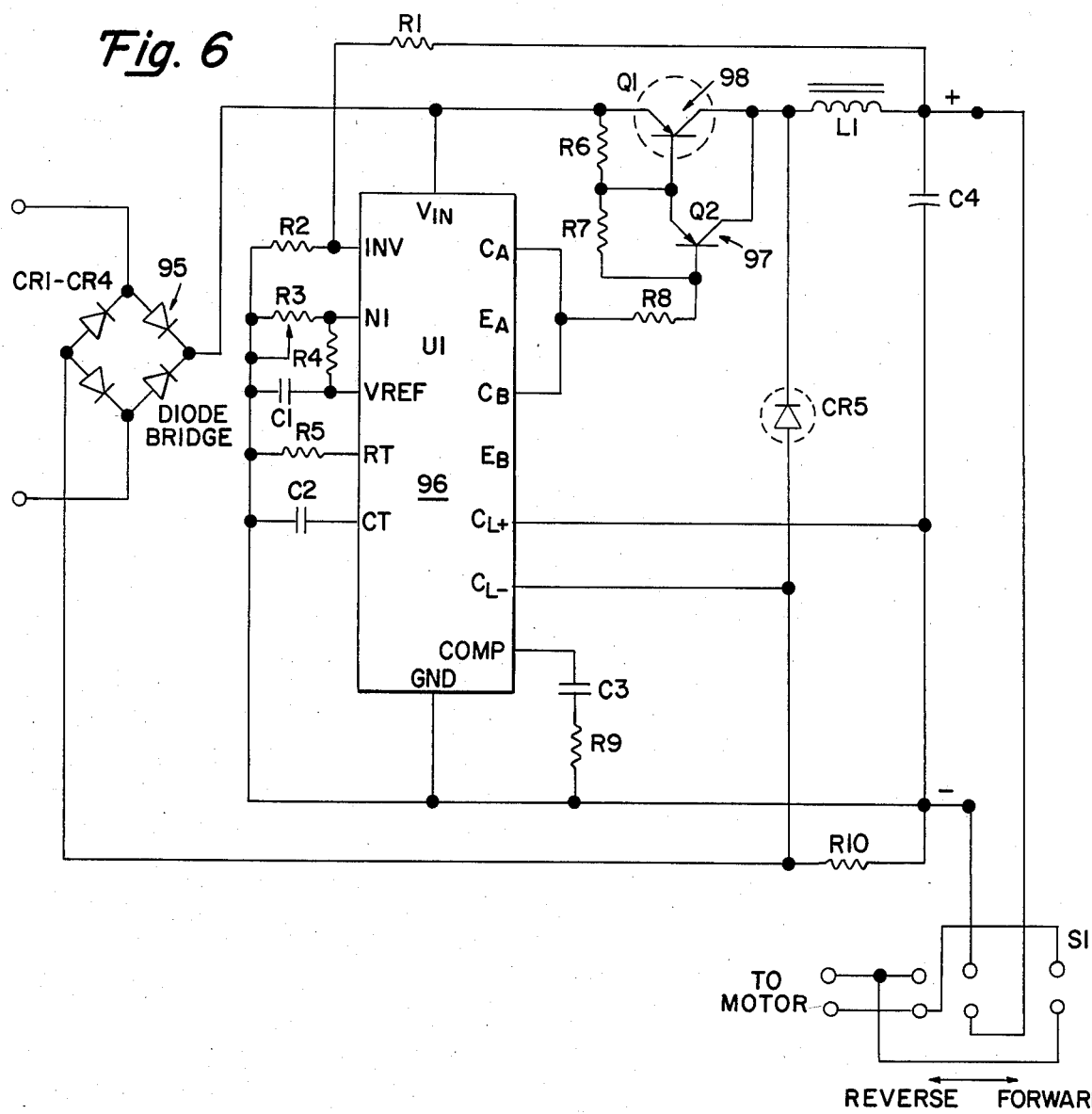
FIG. 6, is a circuit diagram of the electronic control means of the invention.

In FIG. 1, a typical olive tree 21, in an olive grove is depicted, the tree extending well above the height of the average human 22 from ground level 23 and having foliage 24, branches 25, trunks 26 and olives 27.

The picking apparatus 28, of the invention includes the picking head 29, made of light-weight material such as aluminum, the head having a collection hopper 31 with an open top 32 alongside a power drive compartment 33 having a top cover 34.

The collection hopper 31 includes the front wall 35 and rear wall 36, the opposite end walls 37 and 38 and the bottom wall 39, the bottom wall 39 having a discharge opening 41. Preferably ledge means 42, in the form of ledges 43, 44 and 45 are provided to form the upper peripheral rim of the open top 32, the ledges cooperating with the cover 34 to engage twigs and branches of the tree while the olives 27 hanging downwardly therefrom are positioned to be gathered into the hopper 31.

A rake-like member 46 extends across the upper portion of the collection hopper 31 and consists of the shaft 47, journalled in the upper, central portions of the opposite end walls 37 and 38, proximate the level of the open top 32 and having a plurality of straight rows of equally spaced, hooked tines such as 48 spaced therearound, one row in each quadrant. Each tine 48 includes a base portion 49 extending radially outwardly from, and fast on, shaft 47, and a free terminal portion 51, bent at right angles to the base portion to extend circumferentially relative to the shaft 47. The upper portion of front wall 35 is preferably in a flat plane, and bent inwardly to form the ledge 45, and the set of free, terminal portions 51 of the hooked tines 48, when rotated in a circular path, including a zone in close proximity thereto are momentarily in a flat plane parallel to the plane of the upper portion of the front wall, the tips 52 of the tines having nearly touched the adjacent inner edges 53 of the ledge 45 lining the hopper.

The tips 52 of the hooked tines 48 are rounded and blunt and they are spaced apart along the shaft at such distance as will enable them to hook, or rake, off the olives, or other fruit, while the leaves pass through the tines without being dislodged from the tree into the hopper.

Handle means 54 includes the elongated handle 55, formed of multiple, interconnected sections in a known manner, and having a yoke 56 at the upper end 57 in which the picking head 29 is pivotally supported as at 58 and 59 in the upper portions of its end walls so as to hang downwardly gimbal fashion. The lower end 61 of the handle is shown being held by, and manipulated by a user 22.

The power drive compartment 33 contains an electric motor 62 and a power train 63 in the form of intermeshed reduction gears 64, connecting the motor 62 to the shaft 47 to rotate it unidirectionally at about 60 r.p.m. The motor is connected by flexible electric conductors 60 to a suitable source of electricity such as battery pack 65 located proximate ground level 23. It will be understood that the shaft 47 could be rotated by an air motor, hydraulic motor, spring motor or any other convenient power source but a small, light motor and gear train in the head and a flexible power conduit to the ground level is preferred.

The discharge conduit means 66 of the invention consists of a light-weight, flexible, conduit 67 of Nylon fabric, or the like, having its upper end 68 affixed around the discharge opening 41 in the bottom wall 39 of hopper 31 and extending downwardly to a lower end 69 in the collection receptable 71 at, or near ground level 23. Thus, the picked olives raked into the hopper, roll gently down the cloth passage, by gravity, while supported by the cloth, for deposit in the receptacle without damage.

The picking apparatus of the invention, including the head and handle, may be made of a light, hard plastic or of light metal and the motor can be powered from the 12 volt battery of a vehicle such as a tractor or automobile.

The motor 62 is preferably of the reversible type, so that if a branch is inadvertently caught in the hooked tines, rather than pushed aside, the branch can be instantly released by reversing the motor and temporarily rotating the hooked tines in the opposite angular direction.

While I have shown the handle 55 as sectional, and the electric conductor 60 as one piece and outside the handle, I may have the electric conductor also sectional and connected together at each joint of the handle by suitable male and female electric plugs and receptacles.

In the prior art, rotating, sharp pointed, straight, comblike tines have tended to damage the bark of the twigs and branches of the trees during operation. The hooked tines 48, of this invention are preferably blunt tipped and of smooth metal to slide off a twig or branch without damage. However, in some embodiments of the invention, the hooked tines may be coated with a soft layer of rubber-like material to avoid damage to the tree.

As shown in FIGS. 2, 3, and 5, in this invention, the rake-like member, or rotor, 46, is one of a set of similar rotors, each of different dimensions and spacing of the hooked tines 48, so that a particular rotor such as the rotor 72 can be selected to conform to the size of olives to be picked and the density of foliage 24 in the olive trees 21. The rotor 72 has a plurality of hooked tines 48 spaced along and integral with, the shaft 47, preferably of plastic such as "DELRIN", or the equivalent and shaped and dimensioned as shown.

Quick release means 73 is provided, in the form of axial bores 74 and 75 in each opposite end 76 and 77 of shaft 47, there being a pair of shaft rods 78 or 79 each slidable in one of the bores against the pressure of a coil spring such as 81 or 82. A pair of elongated slots 83 and 84 are provided in each opposite end of shaft 47 and a pair of pins 85 and 86 are each slidable in one of the slots and affixed to one of the shaft rods so that compressing the pins toward each other retracts the shaft rods into their respective bores for ready removal of the rotor from their journals 87 and 88 for replacement.

The shaft rods are preferably of square cross section at their outer ends to fit in a square socket in the journal 87 so as to be drivingly connected to the power source.

In this invention the motor 62 is electric and the conduit 60 is an electric cable leading from the motor down the elongated handle 55 to a control box 89 mounted proximate the bottom of the handle and thence leading to the 12 volt battery 65 or an equivalent portable source of electricity.

Control means 91 comprises the electronic control circuit 92 within box 89, there being an exterior ON-OFF-REVERSE SWITCH 93 and a POTENTIOMETER SWITCH 94 on the exterior of the box for easy access by the operator 22. Control circuit 92 adjusts the speed of the rotor in the picking head from approximately 15 r.p.m. to approximately 75 r.p.m. and includes the reversing switch 93 which is a momentary switch with a normally forward position, a center off position and a spring return position, for reversing the rotor in the head. The electronic speed control circuitry in box 89 consists of a diode bridge 95 so that the input power connection can be either polarity.

The speed control circuit 92 also consists of a regulating pulse width undulating chip (micro-circuit) U1 operating at approximately 20 khz. The chip drives two transistors, one low power Q2, and one high power Q1. The dissipation of the power transistor Q1 is normally four watts at maximum speed and ten watts during a stall mode. The elongated handle provides more than adequate heat sink for the power transistor Q1. The other electronic components of the circuit are an inductor L1, a filter capacitor C4, ten small resistors marked R1-R10, three small capacitors C1, C2 and C3, a switching diode CR5, the potentiometer 96 and the reversing switch 93.

The switching diode loss is normally about two watts. The power in the diode increases as the power in the power transistor decreases and vice versa. The maximum dissipation in the switching diode is approximately three to five watts. The micro-circuit has an overcurrent shut down circuit which protects the electronics from a shorted motor.

A control knob 98 for the potentiometer switch 94 is mounted alongside the toggle handle 97 of the on-off reverse switch 93 on the control box 89.

I claim:

1. Portable hand supported and hand manipulated olive picking apparatus of the type comprising a picking head, gimbal supported on the end of an elongated handle, and having, in the head, a plurality of tines on a shaft rotated by a motor, the motor powered by a conduit leading down the handle to a power source at ground level, said apparatus characterized by:
   control means, including a variable speed means, on the handle, proximate ground level for operating said motor at selected speeds to rotate said tines in the range of 15 to 75 r.p.m. to conform with the age and skill of the operator; and
   quick release means having a single elongated shaft along which all of said tines are spaced to extend normal thereto, said shaft having opposite ends each with an axial bore, and said shaft having a pair of shaft rods, each slidable in one of said bores, a pair of coil springs each seated in one of said bores to bias the shaft rod therein, outwardly to project from said bore, a pair of longitudinally extending slots, each in one of the ends of said shaft and a pair of pins, each affixed to one of said shaft rods and projecting through the adjacent slot;
   movement of said pins toward each other against pressure of said springs retracting said shaft rods into said bores for removal and replacement of said tines and shaft from said head.

2. A combination as specified in claim 1 wherein:
   said motor is electric, said power source is a portable source of electricity, said conduit is an electric cable connecting said motor to said source and said control means comprises an electronic control circuit including a forward and reverse switch and a low power potentiometer, adjustable by a speed control knob.

3. Olive picking apparatus of the type comprising a picker head on the upper end of a hand manipulatable elongated handle, the head having a power rotatable rotor journalled therein, and the rotor having a plurality of hooked tines spaced longitudinally therealong and extending radially therefrom, said apparatus characterized by:
   a plurality of said rotors, each having tines of different dimensions and spacing, each rotor having a pair of shaft rods, each spring biased outwardly in, and slidable in, one of a pair of end bores in said rotor and each rod having one of a pair of projecting pins for compressing said rods into said bores and;
   said head having sockets for receiving the portions of one pair of said rods projecting from the bores of one said rotor and drivingly connecting the same to said power;
   whereby a rotor selected from said set of rotors may be easily installed or removed from said head.

* * * * *